(12) United States Patent
Krzanowski et al.

(10) Patent No.: US 9,391,833 B2
(45) Date of Patent: Jul. 12, 2016

(54) FAULT SIGNALING FOR ETHERNET

(75) Inventors: Roman Krzanowski, White Plains, NY (US); Michael U. Bencheck, Richardson, TX (US); Vincent Anthony Alesi, Yorktown Heights, NY (US); Virgil M. Vladescu, Hillsdale, NJ (US); Richard L. Wheeler, Flemington, NJ (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 788 days.

(21) Appl. No.: 13/303,689

(22) Filed: Nov. 23, 2011

(65) Prior Publication Data
US 2013/0128750 A1 May 23, 2013

(51) Int. Cl.
*G01R 31/08* (2006.01)
*H04L 12/24* (2006.01)
*H04L 12/26* (2006.01)

(52) U.S. Cl.
CPC ........ *H04L 41/0213* (2013.01); *H04L 41/0226* (2013.01); *H04L 41/06* (2013.01); *H04L 43/0811* (2013.01)

(58) Field of Classification Search
USPC ........... 370/216, 241.1, 242, 229, 236.2, 384, 370/389; 398/1; 714/43, 48, 51, 55
See application file for complete search history.

(56) References Cited

U.S. PATENT DOCUMENTS

| | | | |
|---|---|---|---|
| 7,213,178 B1* | 5/2007 | Prasad et ......................... | 714/43 |
| 8,054,751 B2* | 11/2011 | Elie-Dit-Cosaque et al. ......................... | 370/241.1 |
| 8,964,525 B1* | 2/2015 | Kuthanur et al. ............. | 370/216 |
| 2002/0196784 A1* | 12/2002 | Masuda .................... | H04J 3/14 370/355 |
| 2003/0112748 A1* | 6/2003 | Puppa et al. .................. | 370/217 |
| 2003/0112760 A1* | 6/2003 | Puppa et al. ............... | 370/241.1 |
| 2006/0031482 A1* | 2/2006 | Mohan ................ | H04L 12/4641 709/224 |
| 2006/0075126 A1* | 4/2006 | Lehrschall et al. ........... | 709/229 |
| 2007/0190998 A1* | 8/2007 | Tanaka et al. ................. | 455/423 |
| 2008/0144632 A1* | 6/2008 | Rabie et al. ................ | 370/395.5 |
| 2008/0151907 A1* | 6/2008 | Ge .......................... | H04L 12/66 370/395.53 |
| 2009/0109837 A1* | 4/2009 | Kini et al. ...................... | 370/216 |
| 2010/0246406 A1* | 9/2010 | Hill et al. ................... | 370/241.1 |
| 2010/0293233 A1* | 11/2010 | Salam ................ | H04L 12/4641 709/206 |

(Continued)

FOREIGN PATENT DOCUMENTS

WO    WO-2011/045679 A1 *    4/2011    ............ H04L 12/24

OTHER PUBLICATIONS

International Telecommunicaton Union, Recommendation ITU-T Y.1731 (2008)—Amendment 1, "OAM Functions and Mechanism for Ethernet Based Networks, Amendment 1: Addition of New OAM 'ETH-CSF', Interoperability Between ETH-LT (2006) and ETH-LT (2008)," Jul. 2010, 20 pages.

(Continued)

*Primary Examiner* — Phuongchau Ba Nguyen

(57) ABSTRACT

A method may include receiving a message from a first Ethernet interface in a second Ethernet interface, wherein the message includes a first attribute indicative of an Ethernet service at the first interface according to a first operation, administration, or management (OAM) protocol. The method may further include mapping the first attribute to a second attribute, wherein the second attribute is in accordance with a second OAM protocol different than the first OAM protocol. The method may further include performing an operation at the second interface based on the second attribute.

20 Claims, 9 Drawing Sheets

(56) References Cited

U.S. PATENT DOCUMENTS

| | | | | |
|---|---|---|---|---|
| 2011/0058483 | A1* | 3/2011 | Mohan | H04L 12/2602 370/241.1 |
| 2011/0292941 | A1* | 12/2011 | Yatsu | H04L 45/50 370/392 |
| 2012/0069742 | A1* | 3/2012 | Kaufmann et al. | 370/242 |
| 2012/0155283 | A1* | 6/2012 | Sanguineti et al. | 370/241.1 |
| 2012/0271928 | A1* | 10/2012 | Kern | H04L 41/084 709/220 |
| 2013/0114394 | A1* | 5/2013 | Hu | H04L 41/0816 370/216 |

OTHER PUBLICATIONS

International Telecommunication Union, Recommendation ITU-T Y.1731, "OAM Functions and Mechanisms for Ethernet Based Networks," Feb. 2008, 82 pages.

METRO Ethernet Forum, Technical Specification—MEF 16, "Ethernet Local Management Interface (E-LMI)," Jan. 2006, 41 pages.

IEEE Standard for Information Technology, 802.3, "Part 3: Carrier Sense Multiple Access with Collision Detection (CSMA/CD) Access Method and Physical Layer Specifications," 2008, 615 pages.

\* cited by examiner

MAPPING TABLE 800

| NEAR-END OAM ATTRIBUTE 802 | INTERMEDIATE OAM ATTRIBUTE 804 | FAR-END OAM ATTRIBUTE 806 |
|---|---|---|
| 802.3AH – LINK FAULT | 802.3AH – LINK FAULT | 802.3AH – CRITICAL EVENT |
| 802.3AH – DYING GASP | 802.3AH – DYING GASP | 802.3AH – CRITICAL EVENT |
| 802.3AH – CRITICAL EVENT | 802.3AH – CRITICAL EVENT | 802.3AH – CRITICAL EVENT |
| 802.3AH – EVENT CONDITION | 802.3AH – EVENT CONDITION | 802.3AH – CRITICAL EVENT |

FIG. 8A

MAPPING TABLE 810

| NEAR-END OAM ATTRIBUTE 812 | INTERMEDIATE OAM ATTRIBUTE 814 | FAR-END OAM ATTRIBUTE 816 |
|---|---|---|
| 802.3AH – LINK FAULT | 802.3AH – LINK FAULT | LOS |
| 802.3AH – DYING GASP | 802.3AH – DYING GASP | LOS |
| 802.3AH – CRITICAL EVENT | 802.3AH – CRITICAL EVENT | OPERATOR DEPENDENT |
| 802.3AH – EVENT CONDITION | 802.3AH – EVENT CONDITION | OPERATOR DEPENDENT |

FIG. 8B

MAPPING TABLE 820

| NEAR-END OAM ATTRIBUTE 822 | INTERMEDIATE OAM ATTRIBUTE 824 | FAR-END OAM ATTRIBUTE 826 |
|---|---|---|
| Y.1731 - LOS | Y.1731 - LOS | 802.3AH – OPERATOR SELECTED |

FIG. 8C

FAULT SIGNALING FOR ETHERNET

BACKGROUND

In recent years, carrier-class Ethernet has emerged as a significant technology with respect to transport of traffic over Metro Area Networks (MANs). For example, in the United States, the demand for Ethernet services is expected to increase at a compound annual growth rate (CAGR) of over 20%. The demand is projected to exceed $5 billion by 2012. Such growth and increasing demand are partly driven by the need for higher bandwidth for site-to-site and data center connectivity, scalability, performance, and security.

BRIEF DESCRIPTION OF THE DRAWINGS

FIG. 8A through 8C are diagrams of exemplary mapping tables;

DETAILED DESCRIPTION OF THE PREFERRED EMBODIMENTS

The following detailed description refers to the accompanying drawings. The same reference numbers in different drawings may identify the same or similar elements. The following detailed description does not limit the invention, as claimed.

Figure 1A:
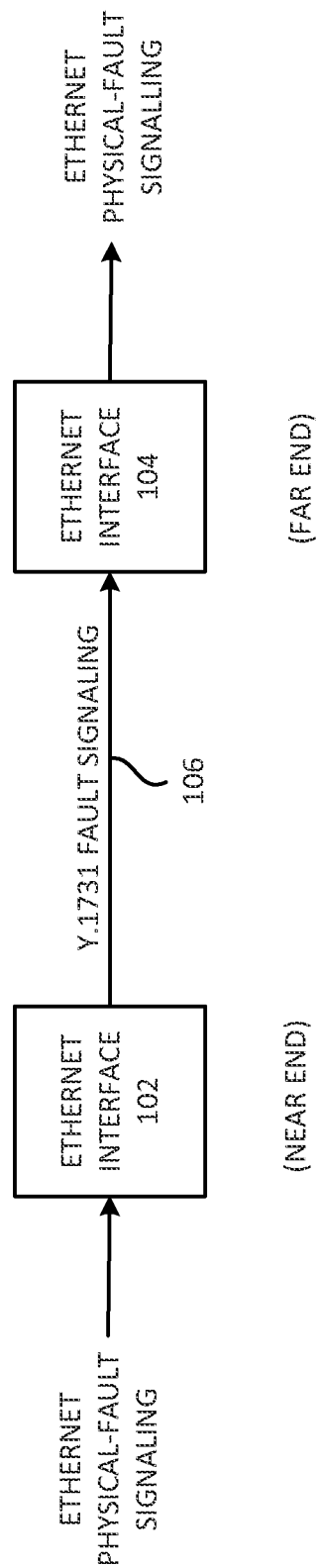
FIGS. 1A and 1B illustrate an exemplary network including two Ethernet interfaces with fault signaling.

FIG. 1A is a block diagram of an exemplary network including a near-end Ethernet interface 102 and a far-end Ethernet interface 104. In this example, an Ethernet service attribute (e.g., error condition) may be detected at interface 102 (e.g., using an operation, administration, and management (OAM) protocol). This attribute may be communicated to far-end interface 104 over link 106 via the Telecommunication Standardization Section of the International Telecommunication Union (ITU) Y.1731 (February 2008), Amendment 1 (July 2010). Link 106 may include a point-to-point Ethernet connection and/or an Ethernet Virtual Channel (EVC).

In particular, a client signal fail (CSF) protocol data unit (PDU) may include a three-bit Type field that can signal a client loss of signal (LOS), a client forward defect indication (FDI/AIS), a client remote defect indication (RDI), or a client defect clear indication (DCI). The CSF-PDU may be communicated from the near-end interface 102 to the far-end interface 104. This limited number of types, however, does not sufficiently describe attributes in a way such that interface 104 may appropriately act based on what is actually occurring at interface 102. For example, if a LOS is signaled from interface 102 to interface 104, interface 104 may shutdown, which may not be a necessary response in view of the actual conditions that caused the LOS attribute.

Further, interface 102 may employ a different OAM protocol than interface 104. In this case, the current ITU Y.1731 standard cannot communicate information generated from one OAM protocol from interface 102, across link 106, to interface 104 employing another OAM protocol.

Figure 1B:
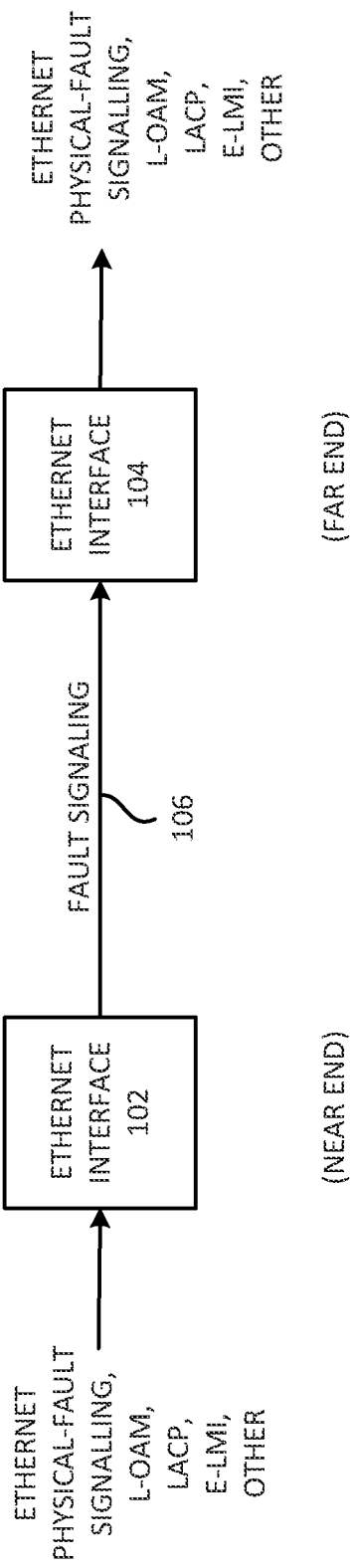

FIG. 1B is a block diagram of an exemplary network including near-end Ethernet interface 102 and far-end Ethernet interface 104. In this embodiment, link 106 may signal OAM attributes (e.g., faults) from interface 102 to interface 104. In embodiments described below, the fault signaling may allow for information or attributes generated by one OAM protocol at interface 102 to be transmitted to interface 104. Further, if interface 102 and interface 104 employ different OAM protocols, the different attributes from the different OAM protocols may be translated or mapped from one to the other. Thus, interface 104 may act appropriately to attribute information provided by interface 102. For example, interface 104 may stop transmitting information to interface 102 rather than shutting down the interface altogether.

Figure 2:
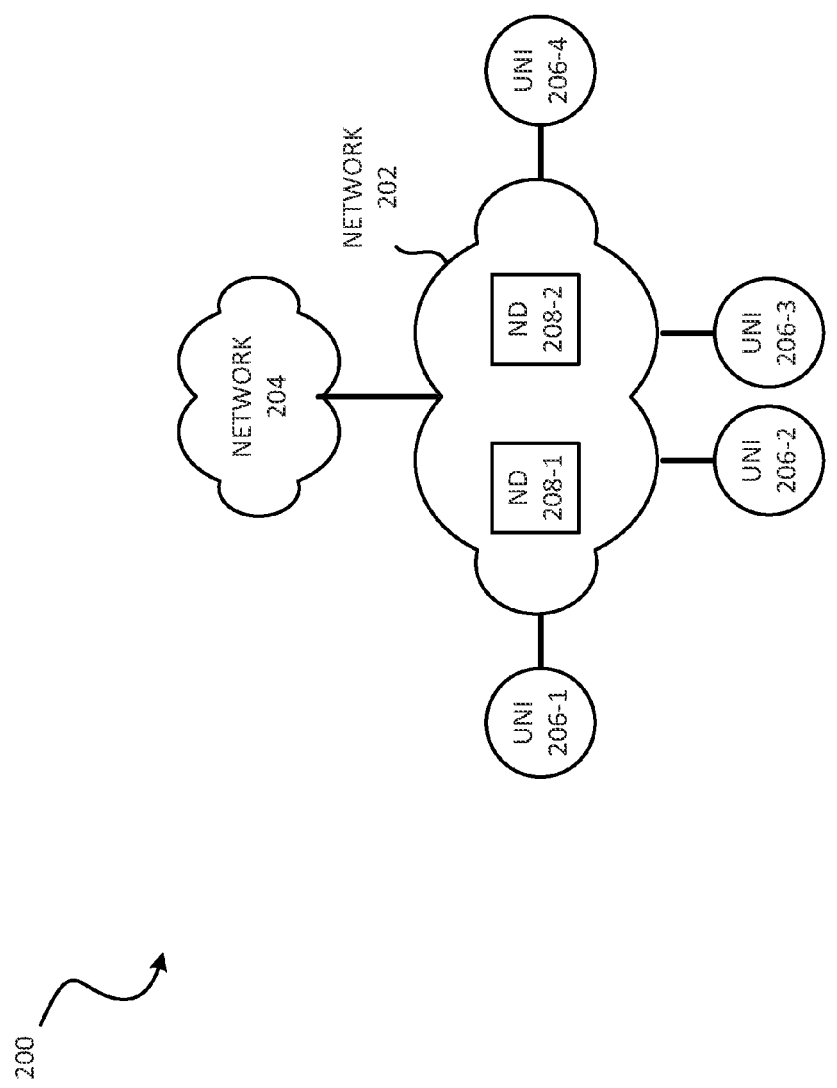
FIG. 2 shows an exemplary network employing Ethernet interfaces, such as a user-to-network interfaces (UNIs)

FIG. 2 shows an exemplary network 200 in which interface 102 and interface 104 may be implemented. As shown, network 200 may include service provider network 202, network 204, user to network interfaces (UNIs) 206-1 through 206-4 (collectively herein referred to as UNIs 206 and individually as UNI 206), and network devices (NDs) 208-1 and 208-2 (collectively network devices 208 and individually network device 208). Depending on the implementation, network 200 may include may include additional, fewer, or different networks and network elements than those illustrated in FIG. 2. For example, in one implementation, network 200 may include metro Ethernet networks (MENs), network-to-network interfaces (NNIs) between the MENs, Synchronous Optical Network (SONET) network rings that are interconnected by long-haul optical lines, additional network elements (e.g., routers, switches, etc.), servers, client devices, wireless devices, etc.

Service provider network 202 may include optical fibers/non-optical lines and central office hubs that are interconnected by the fibers/lines. The optical fibers and the lines may form the backbone of service provider network 202. The central office hubs may provide telecommunication services to subscribers, such as telephone service, access to the Internet, cable television programs, etc., via line terminals. Each central office hub may house telecommunication equipment, including switches (e.g., Ethernet switches), optical line terminals, etc.

Network 204 may include a wired or wireless network via which devices communicate (e.g., a fiber-optic network, a local area network (LAN), a wide area network (WAN), a wireless LAN, a metropolitan area network (MAN), a cellular network, a public switched telephone network (PSTN), an intranet, the Internet, a satellite-based network, any other network, or a combination of networks).

Each UNI 206 may include a physical interface that is a demarcation point between a subscriber and a service provider. UNI 206 is typically provided by a service provider/carrier and may be capable of supporting one or more bandwidths, such as 10 Mbps, 100 Mbps, 1 Gbps, 10 Gbps, etc.

In FIG. 2, one UNI (e.g., UNI 206-1) may form an Ethernet virtual circuit (EVC) over network 202 with another UNI (e.g., UNI 206-2). UNIs that form an EVC may communicate with one another over the EVC. UNIs may form different types of EVCs, such as a point-to-point EVC, multipoint to multipoint EVC, point to multipoint EVC, etc. Multiple EVCs may be bundled within a UNI or multiplexed on the same UNI. Each EVC may carry a single Class of Service (CoS) channel, or alternatively, carry multiple channels of different CoSs (e.g., Ethernet Virtual Private Line (EVPL)-Real Time (RT), EVPL-basic (B), EVPL-Priority Data (PD), etc.).

Each network device 208 may include switches, routers, and/or other network devices. Some of these devices may provide support for Ethernet services (e.g., Cisco 6509 Switch).

Figure 3:
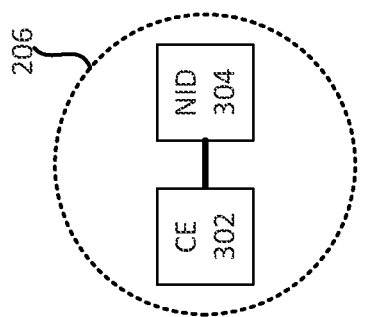
FIG. 3 is a block diagram of exemplary components of the UNI of FIG. 2.

FIG. 3 is a diagram of exemplary components of UNI 206. As shown, UNI 206 may include a customer edge (CE) device 302 and a network interface device (NID) 304. Depending on the implementation, UNI 206 may include fewer, additional, or different devices than those illustrated in FIG. 3. For example, in one implementation, UNI 206 may include only NID 304. In another implementation, UNI 206 may include CE device 302, NID 304, and an Ethernet switch.

CE device 302 may provide an entry/exit to/from customer network, and typically may be located in a customer's premises (e.g., office, apartment, house, etc.). CE device 302 may include interface 102 or interface 104, for example, Examples of CE device 302 include a router, modem, firewall, etc. In FIG. 3, CE device 302 may provide the customer-side functions of UNI (UNI-C).

NID 304 may include a device that provides a service provider/carrier's functions of UNI. In a different implementation, NID 304 may provide for other functions that are associated with a UNI. NID 304 may include interface 102 or interface 104, for example. Examples of NID 304 include telephone network interface (TNI), optical network terminal (ONT), wiring terminals, etc.

Figure 4:
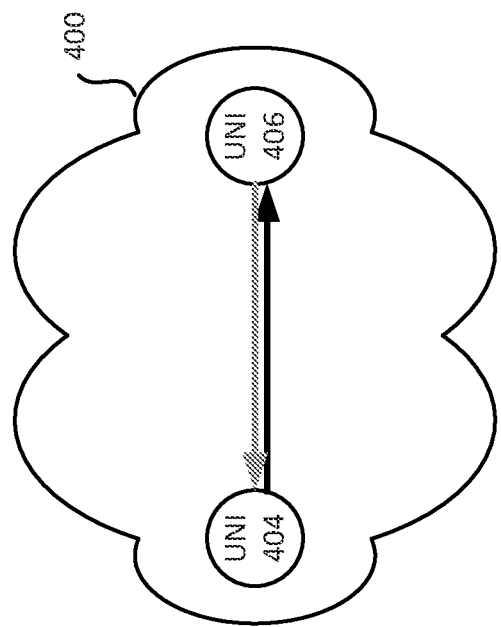
FIG. 4 is a block diagram of additional exemplary UNIs.

FIG. 4 is a diagram of an exemplary point-to-point EVC 400. As shown, point-to-point EVC 400 may include UNI 404 and UNI 406. In a point-to-point EVC (also called E-Line), one UNI may connect directly to another UNI. UNI 404 may include interface 102 or interface 104. UNI 406 may include interface 102 or interface 104. In some implementations, a point-to-point EVC may include an Ethernet private line (EPL), and in other implementations, may include Ethernet Virtual private line (EVPL).

Figure 5B:
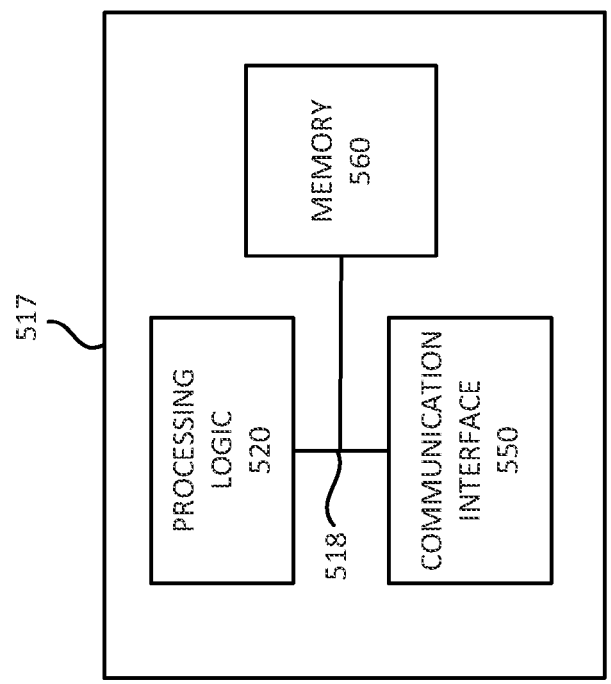
FIG. 5B is a block diagram of exemplary components of a computing module.
Figure 5A:
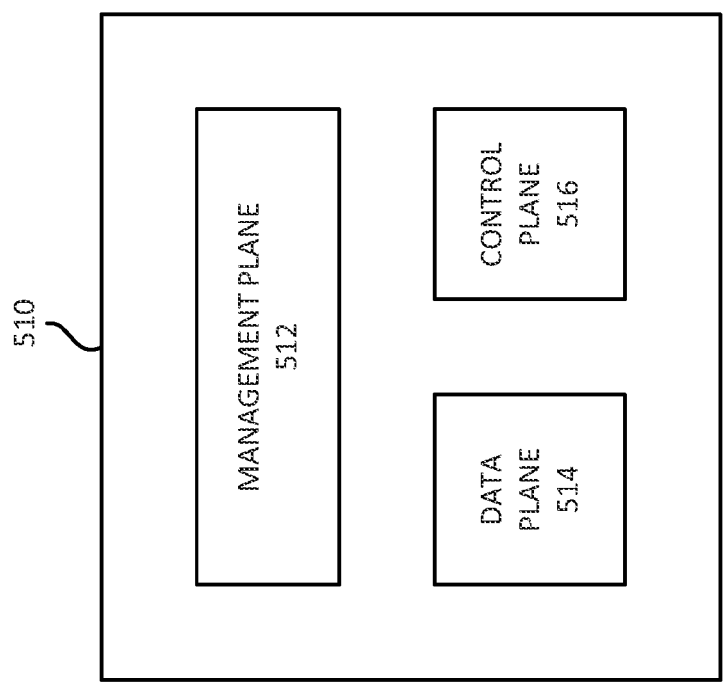
FIG. 5A is a block diagram of exemplary functional or structural components of an interface of FIGS. 1A and 1B.

FIG. 5A is a block diagram of exemplary functional and/or structural components of network elements of FIGS. 1A, 1B, 2, 3, and/or 4. Network element 510 may represent UNI 1206, network device 208, a device in network 202 or 204, a device or component in UNI 206 or in network device 208. As shown in FIG. 5A, network element 510 may include a management plane 512, data plane 514, and control plane 516. Depending on the implementation, network element 510 may include additional, fewer, or different components than those illustrated in FIG. 5A. For example, in some implementations, network element 510 may not include control plane 516.

Management plane 512 may include hardware and/or software components for supporting operation, administration, and management (OAM) functions. For example, management plane 512 may support discovery, remote failure detection/indication, remote loopback testing, alarm generation or processing, link performance monitoring, management information base (MIB) data retrieval, etc.

Data plane 514 may include hardware/software components for processing data. In some implementations, such as routers, data plane 514 may forward data to their destinations in network 200. Examples of data plane 514 may include an Ethernet card, line card of a router, packet processing engine on the line card, forwarding information base (FIB), etc.

Control plane 516 may include hardware/software components for exchanging signaling information between a network device 510 and another network element. This information may include routing information in accordance with a specific protocol, traffic engineering information, etc.

Network devices shown in FIGS. 1A, 1B, 2, 3, and/or 4 may each include one or more computing modules (e.g., each plane in network device 510 may include a computing module). FIG. 5B is a block diagram of exemplary components of a computing module 517. Computing module 517 may include a bus 518, processing logic 520, a communication interface 550, and a memory 560. Computing module 517 may include other components (not shown) that aid in receiving, transmitting, and/or processing data. Moreover, other configurations of components in computing module 517 are possible.

Bus 518 may include a path that permits communication among the components of computing module 517. Processing logic 520 may include any type of processor or microprocessor (or families of processors or microprocessors) that interprets and executes instructions. In other embodiments, processing logic 520 may include an application-specific integrated circuit (ASIC), a field-programmable gate array (FPGA), etc.

Communication interface 550 may include a transceiver that enables computing module 517 to communicate with other devices or systems. Communication interface 550 may include a transmitter and/or a receiver. Memory 560 may store, among other things, information and instructions (e.g., applications and an operating system) and data (e.g., application data) for use by processing logic 520. Memory 560 may include a random access memory (RAM) or another type of dynamic storage device, a read-only memory (ROM) device or another type of static storage device, and/or some other type of magnetic or optical recording medium and its corresponding drive (e.g., a hard disk drive).

Computing module 517 may perform the operations described herein in response to processing logic 520 executing software instructions stored in a computer-readable medium, such as memory 560. A computer-readable medium may include a physical, logical, tangible, and/or non-transient memory device. The software instructions may be read into memory 560 from another computer-readable medium or from another device via communication interface 550. The software instructions stored in memory 560 may cause processing logic 520 to perform processes that are described herein.

Figure 6:
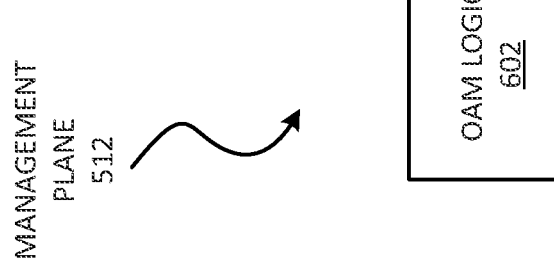
FIG. 6 is a block diagram of exemplary functional components of the management plane of FIG. 5A.

FIG. 6 is a block diagram of exemplary components of management plane 512 of network element 510. As shown, management plane 512 may include OAM logic 602. Although management plane 512 may include additional components, other components are not illustrated for simplicity. In addition, depending on the implementation, a single functional block in FIG. 6 may be implemented as multiple blocks or components.

OAM logic 602 may determine the attribute (e.g., status, health, OAM attributes, etc.) of Ethernet services (e.g., delivered by management plane 512). Such OAM attributes may include layer one and/or layer 2 attributes, for example. OAM logic 602 may determine the OAM attribute according to a management plane protocol. For example, OAM logic 602 may employ Link Aggregation Control Protocol (LACP) or Link-OAM (L-OAM) as defined in IEEE 802.3-2008, part 5 (IEEE 802.3ah). In this example, L-OAM may indicate a "link fault," a "dying gasp," and/or a "critical event." A "link fault" may indicate that the physical layer has determined that a fault has occurred in the receive direction of network element 510. A "dying gasp" may indicate an unrecoverable local failure condition (e.g., as defined by the manufacturer of network element 510) has occurred. A "critical event" may indicate that a critical event (e.g., as defined by the manufacturer or network element 510) has occurred. What is meant by "critical event," "link fault," "dying gasp," may be specific to the manufacturer or the model of network element 510.

As another example, OAM logic 602 may employ E-LMI as defined by the Metro Ethernet Forum (MEF) 16. In this example, E-LMI may indicate the addition of an EVC, the deletion of an EVC, the availability state of a configured EVC (e.g., active, not active, or partially active), or other attributes of a UNI or an EVC.

Figure 7:
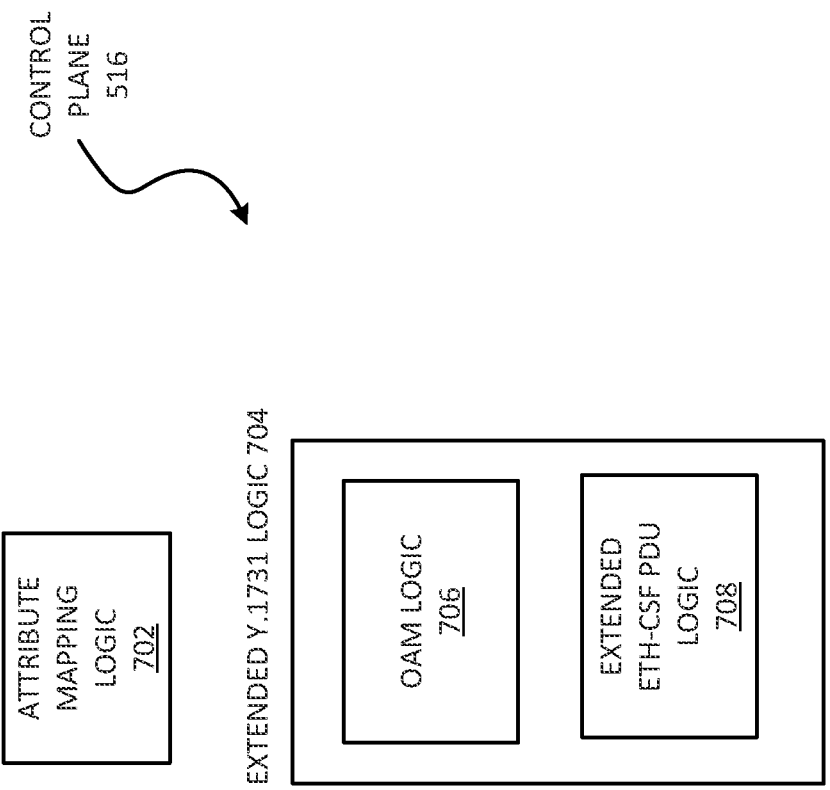
FIG. 7 is a block diagram of exemplary functional components of the control plane of FIG. 5A.

FIG. 7 is a block diagram of exemplary functional components of control plane 516 of network element 510. As shown, data plane 514 may include attribute mapping logic 702 and extended Y.1731 logic 704. Extended Y.1731 logic 704 may include an OAM logic 706 and an extended ETH-CSF PDU logic 708 (PDU logic 708). Although data plane 514 may include additional components, such as a processor, network interface, etc., for simplicity, they are not illustrated in FIG. 7. In addition, depending on the implementation, two or more functional blocks in FIG. 7 may be combined into one, or a single functional block in FIG. 7 may be implemented as multiple blocks or components.

As mentioned above, mapping logic 702 in near-end interface 102 may map a near-end OAM attribute into an intermediate attribute (e.g., according to a mapping table) for a message that is transmitted to a far-end interface. Further, mapping logic 702 in far-end interface 104 may map an OAM attribute in a received message into a far-end OAM attribute (e.g., according to a mapping table). Exemplary mapping tables are described below in more detail with respect to FIGS. 8A-8C.

OAM logic 702 may determine the attribute (e.g., status, health, OAM attributes, etc.) of Ethernet services (e.g., delivered by data plane 512). Such OAM attributes may include layer one and/or layer 2 attributes, for example. OAM logic 702 may determine the OAM attribute according to a data plane protocol. For example, OAM logic 702 may employ Y.1731. In this example, the Y.1731 protocol may determine an attribute of LOS, FDI/AIS, RDI, or DCI.

Figure 9A:
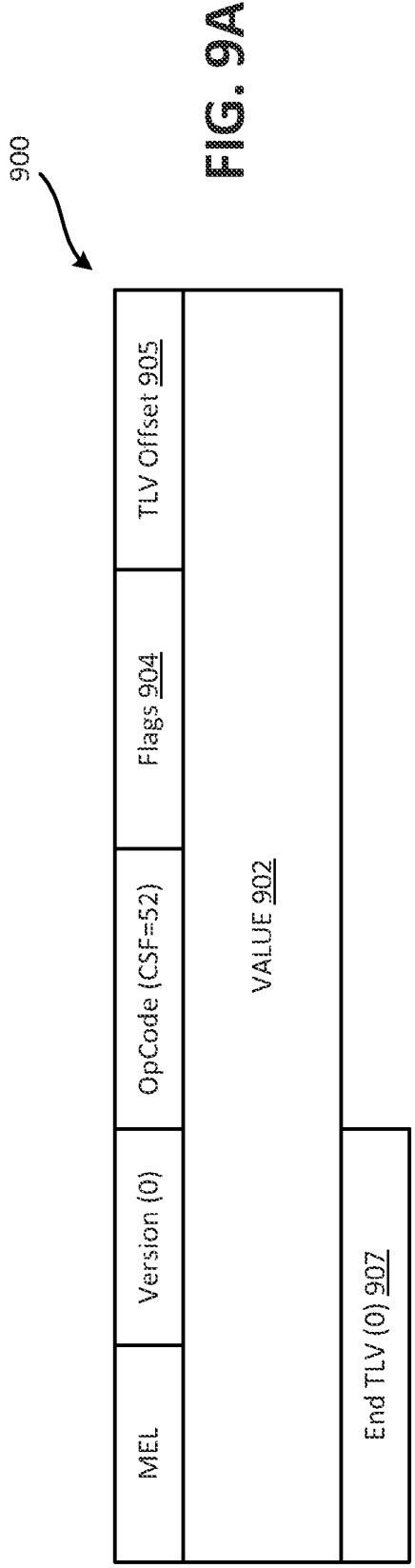
FIG. 9A is a block diagram of an exemplary operation, administration, and maintenance (OAM) protocol data unit (PDU) according to the Y.1731 standard.

Extended ETH-CSF PDU logic 708 may generate a PDU for signaling OAM information from near-end interface 102 to far-end interface 104. In this respect, PDU logic 708 may include a three-bit Type field that can signal LOS, FDI/AIS, RDI, or DCI. In one embodiment, PDU logic 708 may also employ a Type field that is larger than three bits to signal additional information. In one embodiment, PDU logic 708 may generate a CSF-PDU that includes a TLV fields (type-length-value). In this case, a value field may specify information about attributes or include the attribute itself. FIG. 9A, discussed below, includes information about generating a CSF-PDU.

FIGS. 8A-8C are diagrams of exemplary mapping tables 800, 810, and 820 in one embodiment. As shown in FIG. 8A, mapping table 800 is an example of a mapping table that may be used by two interfaces employing IEEE 802.3ah (e.g., L-OAM), for example. Mapping table 800 may include a near-end OAM attribute field 802, a intermediate OAM attribute field 804, and a far-end OAM attribute field 806. In one embodiment, mapping table 800 may be stored in or used by mapping logic 702.

Near-end OAM attribute field 802 may include information indicative of the OAM attribute determined by OAM logic 602. As discussed above, OAM logic 602 may employ LACP, L-OAM, or E-LMI, etc., for example, to determine a near-end OAM attribute. As shown in field 802, possible near-end OAM attributes may include "link fault," "dying gasp," "critical event," and "event condition."

Intermediate OAM attribute field 804 may include the OAM attributes, for embedding into a message, that correspond to the near-end OAM attributes listed in field 802. For example, according to field 804, an intermediate attribute of "link fault" corresponds to "link fault" attribute in field 802. An intermediate attribute of "dying gasp" (indicated in field 804) corresponds to "link fault" attribute in field 802. An attribute of "critical event" (indicated in field 804) corresponds to "critical event" attribute in field 802. An attribute of "event condition" (indicated in field 804) corresponds to "event condition" attribute in field 802.

Far-end OAM attribute field 806 may include the OAM attributes that correspond to an OAM protocol understood by, for example, far-end interface 104. For example, according to field 806, attribute of "critical fault" corresponds to an intermediate OAM attribute of "link fault," "dying gasp," "critical event," or "event condition."

As mentioned above, mapping table 800 may be used, for example, by a near-end interface and a far-end interface that both employ IEEE 802.3ah. In this example, the near-end interface may store fields 802 and 804, while the far-end interface may store fields 804 and 806. In another embodiment, the near-end interface and the far-end interface may store all three fields. Further, the mappings shown in FIG. 8A are exemplary and other mappings are possible.

Mapping table 810, shown in FIG. 8B, is an exemplary table that may be used by a near-end interface that employs IEEE 802.3ah and a far-end interface does not employ IEEE 802.3ah. Mapping table 810 includes a near-end OAM attribute field 812, an intermediate OAM attribute field 814, and a far-end OAM attribute field 816.

The type of information stored in field 812 may be similar to the type of information stored in field 802. Likewise, the information stored in field 814 may be similar to the type of information stored in field 804 and the information stored in field 816 may be similar to the type of information stored in field 806. Far-end OAM attribute field 816 may store different information than field 806 because, in this example, the far-end interface does not employ IEEE 802.3ah. In this example, an intermediate attribute of "link fault" corresponds to a far-end OAM attribute of "LOS" in field 816. Further, an intermediate attribute of "dying gasp" corresponds to a far-end attribute of "LOS." An intermediate attribute of "critical event" or "event condition" correspond to a far-end OAM attribute that may be defined by the administrator, manufacturer, or operator. In this embodiment, near-end interface 102 may store the information in fields 812 and 814. Far-end interface 104 may store the information in fields 814 and 816. In other embodiments, both interfaces may store the complete table 800.

Mapping table 820, shown in FIG. 8C, may be used, for example, by a near-end interface that does not employ IEEE 802.3ah and a far-end interface that does employ IEEE 802.3ah. Mapping table 820 includes a near-end OAM attribute field 822, an intermediate OAM attribute field 824, and a far-end OAM attribute field 826.

The type of information stored in field 822 may be similar to the type of information stored in field 802. Likewise, the information stored in field 824 may be similar to the type of information stored in field 804 and the information stored in field 826 may be similar to the type of information stored in field 806. Near-end OAM attribute field 822 may store different information than field 802 because, in this example, the near-end interface does not employ IEEE 802.3ah. Rather, in this example, the near-end interface only employs Y.1731. In this example, an attribute of LOS may be detected, as indicated in field 822. An intermediate attribute of "LOS," defined in field 824, corresponds to a near-end OAM attribute of "LOS" in field 826. An intermediate attribute of "critical event" or "event condition" corresponds to a far-end OAM attribute that may be defined by the operator, manufacturer, or administrator.

As indicated above, messages may carry attributes (e.g., fault signals) from interface 102 to interface 104. FIG. 9A is a block diagram of an exemplary message 900 in one embodiment. Message 900 may be an OAM PDU. Message 900 may include an MEL field, a Version field, an OpCode field, a Flags field 904, a TLV Offset field 905, a value field 902, and an end TLV field 907. The version field and OpCode field may include information as defined, for example, in Y.1731.

Figure 9B:
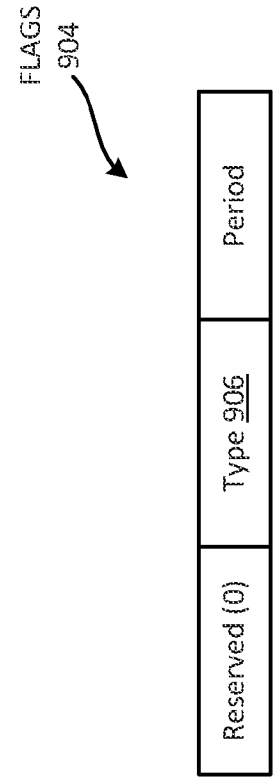
FIG. 9B is a block diagram of an exemplary type field of a client signal fault (CSF) PDU of FIG. 9A.

In one embodiment, as shown in FIG. 9B, flags field 904 may include a reserved field, a Type field 906, and a period field. Reserved field and Period field may include information as defined, for example, in Y.1731. Type field 906 may include information indicative of an OAM attribute, such as those specified in fields 804, 814, and/or 824). For example, Type field 906 may include a 16-bit field that specifies 65,536 different possible OAM attributes.

TLV Offset field 905 may include information that specifies the type and length, for example of value field 902. End TLV field 907 may indicate the end of value field 902. In one embodiment, value field 902 may include information indicative of an OAM attribute, such as the attributes specified in fields 804, 814, and/or 824.

Figure 10:
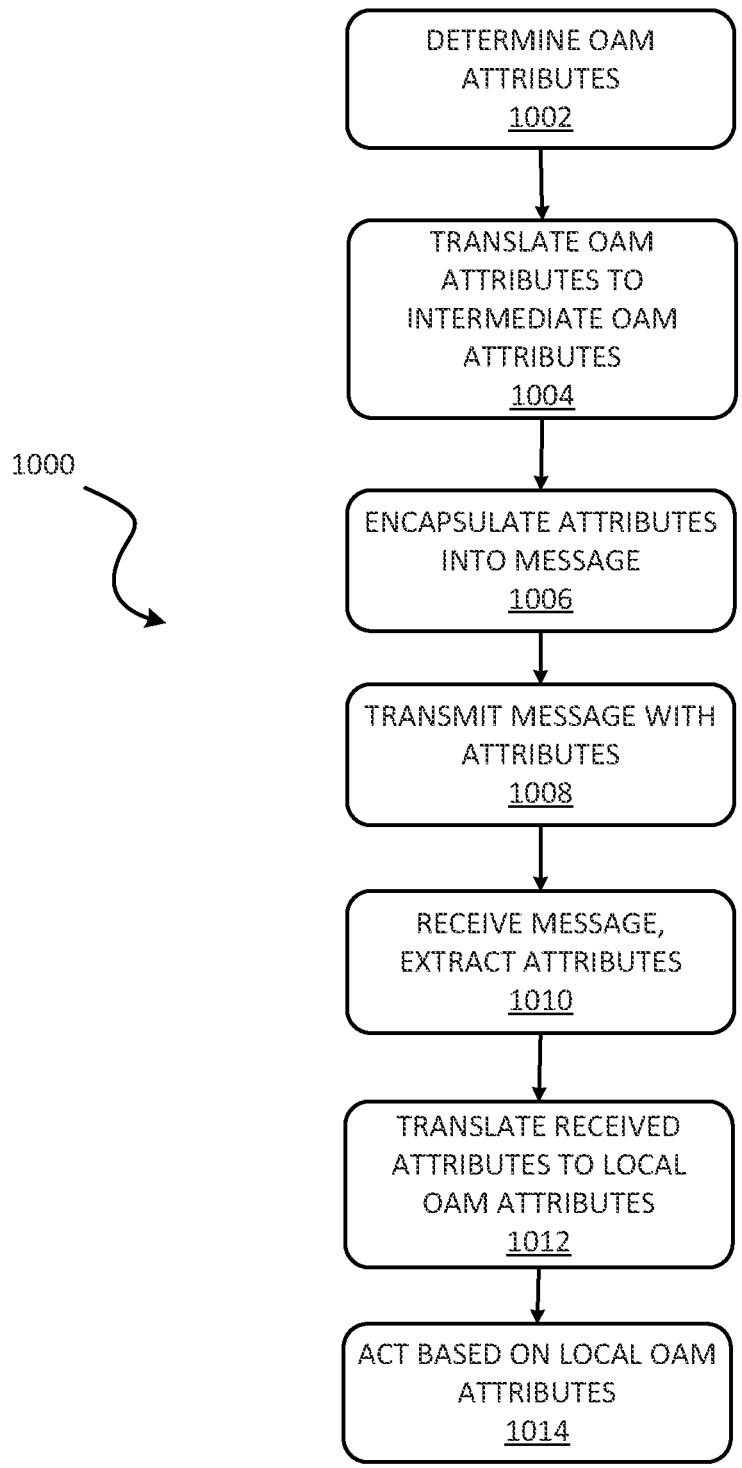
FIG. 10 is a flowchart of a process for signaling faults from one interface to another interface.

FIG. 10 is a flowchart of a process 1000 for transmitting OAM attributes from one Ethernet interface to another Ethernet interface. Process 1000 is described with respect to FIG. 1B, in which a fault signal is passed from near-end interface 102 to far-end interface 104. As shown in FIG. 10, process 1000 may begin with the determination of OAM attributes (block 1002). OAM logic 602 in management plane 512 may employ LACP, L-OAM, or E-LMI to detect the status (e.g., attributes) of near-end interface 102. For example, OAM logic 602 may employ L-OAM of IEEE 802.3ah to determine whether there is a "link fault," "a dying gasp," a "critical event," or an "event condition."

The OAM attributes may be mapped into OAM attributes for a message to be transmitted to another interface (block 1004). Using mapping table 800, for example, a link fault error (field 802) may be mapped into another link fault message (field 804) for transport over link 106 to far-end interface 104. The intermediate OAM attributes may be encapsulated into an Ethernet message (block 1006). For example, the OAM attribute message may be encoded into field 902 of packet 900. In another embodiment, the OAM attribute message may be encoded into field 906 (e.g., an extended 16 bit Type field). The message with the attributes may be transmitted to another Ethernet interface (block 1008).

The far-end Ethernet interface receives the message and extracts the attributes (block 1010). For example, interface 104 may receive the message over link 106 and extract the attribute (e.g., link fault). The received attributes may be mapped into near-end OAM attributes (block 1012). For example, using mapping table 800, a "link fault" attribute (field 804) is mapped into a "critical event" attribute (field 806). The Ethier interface may act on the near-end OAM attributes (block 1014). In the current example, interface 104 may act on the information in a fashion appropriate for interface 104. The action may be short of shutting down interface 104 (e.g., not transmitting signals to interface 102), and may include sending an alarm, recording error status, etc.

In the above example, interface 104 included fields 804 and 806 of table 800, indicating that interface 104 included IEEE 802.3ah signaling. In another embodiment, interface 104 may not include such signaling. Instead, interface 104 may use fields 814 and 816 of mapping table 810. In this case, the "link fault" attribute may be mapped into a "LOS" attribute in interface 104. If the message from interface 102 included a "critical event" attribute or an "event condition" attribute, then fields 814 and 816 indicate that the attributes in these messages may be mapped to an operator-dependent OAM attributes. Thus, the manufacturer of interface 104 (or the administrator of interface 104) may program the attribute and actions accordingly.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method comprising:
receiving a message, from a first Ethernet interface, in a second Ethernet interface, wherein the message includes an intermediate attribute, wherein a first attribute, indicative of an Ethernet service at the first Ethernet interface according to a first operation, administration, or management (OAM) protocol, was mapped, using a first mapping table stored at the first Ethernet interface, into the intermediate attribute at the first Ethernet interface for embedding in the message;
mapping, at the second Ethernet interface and using a second mapping table stored at the second Ethernet interface, the intermediate attribute to a second attribute, wherein the second attribute is in accordance with a second OAM protocol different than the first OAM protocol; and
performing an operation at the second Ethernet interface based on the second attribute.

2. The method of claim 1, further comprising:
encoding the intermediate attribute into the message; and
transmitting the message from the first Ethernet interface to the second Ethernet interface.

3. The method of claim 2, wherein the first OAM protocol includes a management plane protocol, wherein encoding and transmitting includes encoding and transmitting the message according to a data plane protocol.

4. The method of claim 1, wherein the message includes an OAM protocol data unit (PDU) according to a Y.1731 standard.

5. The method of claim 1, wherein the first OAM protocol includes one of an OAM protocol according to IEEE 802.3 or an OAM protocol according to Metro Ethernet Forum (MEF) 16; and wherein the second OAM protocol includes one of an OAM protocol according to IEEE 802.3 or an OAM protocol according to MEF 16.

6. The method of claim 1, wherein the first attribute indicates a status of the Ethernet service at the first Ethernet interface.

7. The method of claim 1, wherein the message includes an OAM protocol data unit (PDU) that includes a client signal fault (CSF) PDU including a type field greater than three bits specifying the first attribute or a variable length field specifying the first attribute.

8. A system comprising:
a network device comprising:
a first interface to receive a message from a second interface, wherein the message includes an intermediate attribute, and wherein a first attribute, indicative of an Ethernet service at the second interface according to a first operation, administration, or management (OAM) protocol, was mapped, using a first mapping table stored at the second interface, to the intermediate attribute for embedding in the message; and
a processor to map, using a second mapping table stored at the network device, the intermediate attribute to a second attribute, wherein the second attribute is in accordance with a second OAM protocol different than the first OAM protocol, and to perform an operation at the first interface based on the second attribute.

9. The system of claim 8, wherein the network device is a first network device, the system further comprising:
a second network device including:
the second interface for transmitting the message including the intermediate attribute to the first interface; and
a second processor to determine the first attribute at the second interface indicative of the Ethernet service at the second interface according to the first OAM protocol, and to map the first attribute to the intermediate attribute according to an intermediate OAM map.

10. The system of claim 8,
wherein the processor is further configured to encode, at the second interface, the intermediate attribute into the message; and
wherein the second interface is configured to transmit the message from the second interface to the first interface.

11. The system of claim 10, wherein the first OAM protocol includes a management plane protocol, wherein encoding and transmitting includes encoding and transmitting the message according to a data plane protocol.

12. The system of claim 8, wherein the message includes an OAM protocol data unit (PDU) according to a Y.1731 standard.

13. The system of claim 8, wherein the first OAM protocol includes one of an OAM protocol according to IEEE 802.3 or an OAM protocol according to Metro Ethernet Forum (MEF) 16; and wherein the second OAM protocol includes one of an OAM protocol according to IEEE 802.3 or an OAM protocol according to MEF 16.

14. The system of claim 8, wherein first attribute indicates a status of the Ethernet service at the second interface.

15. A method comprising:
determining, at a first Ethernet interface, a first attribute indicative of an Ethernet service at the first Ethernet interface according to a first operation, administration, or management (OAM) protocol;
mapping, at the first Ethernet interface and based on information in a mapping table stored at the first Ethernet interface, the first attribute to an intermediate OAM attribute for embedding in a message;
encoding the intermediate OAM attribute into the message; and
transmitting the message from the first Ethernet interface to a second Ethernet interface.

16. The method of claim 15 further comprising:
receiving, in the second Ethernet interface, the message, wherein the message includes the intermediate OAM attribute;
mapping the intermediate OAM attribute to a second attribute, wherein the second attribute is in accordance with a second OAM protocol different than the first OAM protocol; and
performing an operation at the second Ethernet interface based on the second attribute.

17. The method of claim 16, wherein the first OAM protocol includes one of an OAM protocol according to IEEE 802.3 or an OAM protocol according to Metro Ethernet Forum (MEF) 16; and wherein the second OAM protocol includes one of an OAM protocol according to IEEE 802.3 or an OAM protocol according to MEF 16.

18. The method of claim 15, wherein the message includes an OAM protocol data unit (PDU) according to a Y.1731 standard.

19. The method of claim 15, wherein the first OAM protocol includes a management plane protocol, wherein encoding and transmitting includes encoding and transmitting the message according to a data plane protocol.

20. The method of claim 15, wherein the first attribute indicates a status of the Ethernet service at the first Ethernet interface.

* * * * *